United States Patent [19]

Hull

[11] Patent Number: 5,745,524
[45] Date of Patent: Apr. 28, 1998

[54] SELF-INITIALIZED CODER AND METHOD THEREOF

[75] Inventor: Andrew William Hull, North Richland Hills, Tex.

[73] Assignee: Motorola, Inc., Schaumburg, Ill.

[21] Appl. No.: 592,755

[22] Filed: Jan. 26, 1996

[51] Int. Cl.[6] .................................................. H04B 14/06
[52] U.S. Cl. ........................ 375/244; 375/231; 341/143
[58] Field of Search .................................. 375/244, 245, 375/231; 341/143

[56] References Cited

U.S. PATENT DOCUMENTS

| 4,621,366 | 11/1986 | Caine et al. | 375/231 |
| 4,829,543 | 5/1989 | Borth et al. | 375/232 |
| 5,274,670 | 12/1993 | Serizawa et al. | 375/231 |

OTHER PUBLICATIONS

CCITT Blue Book; Melbourne, 1988; 32 kbit/s Adaptive Differential Pulse Code Modulation (ADPCM); Fascicle III.4–Rec. G.721; pp. 231–340.

Spanias, Andreas S.; "Speech Coding: A Tutorial Review"; IEEE, vol. 82, No. 10, Oct. 1994; pp. 1541–1582.

Wireless Communication 1995; Chapter 2 American and European Speech Codecs; Section 2.3.2 "ADPCM Codecs for the European CT-2 and DECT Systems"; pp. 51–53.

*Primary Examiner*—Stephen Chin
*Assistant Examiner*—Bryan Webster
*Attorney, Agent, or Firm*—Charles W. Bethards

[57] ABSTRACT

A self initialized coder and method thereof, the coder arranged and constructed for decoding an information stream, the coder including a buffer (301) for storing a portion (403) of the information stream, a controller (313) coupled to the buffer for temporally reversing a first part (401) of the portion to provide a file header (415), and an adaptive decoder (213) having a state parameter, the adaptive decoder, coupled to the controller and the buffer, for decoding the file header to provide an estimate of the state parameter and thereafter for decoding, using the estimate, the portion to provide a decoded signal.

24 Claims, 5 Drawing Sheets

5,745,524

1

SELF-INITIALIZED CODER AND METHOD THEREOF

FIELD OF THE INVENTION

The present disclosure concerns communications receivers and more specifically but not limited to a self initialized coder and methods thereof for deployment in such receivers.

BACKGROUND OF THE INVENTION

Communications receivers and certain coders and the application of such are well known. These receivers and coders are used as part of systems that are arranged to transport various forms of information from an originating point to a receiving point over an intervening channel. For various reasons, including the advent of digital electronics and integrated circuits having sufficient complexity and capability at reasonable economic burdens, communication systems have tended more and more to digital rather than analog implementations. In digital implementations the information is represented by discreet, rather than relatively continuous, signal levels. A coder is often employed to generate the discreet signal levels that are expected to be transported over the channel These discreet signal levels, ordinarily representative of predetermined amplitudes or phases, are referred to typically as symbols or in the case of a binary channel, bits. Even where symbols are more complex than the binary case these symbols will be derived or determined from and eventually, at the receiving end, converted to a binary or bit format. Various channel characteristics, largely bandwidth as many others to a first order may be fixed, place a limitation on the number of symbols thus indirectly, or in the binary case directly, bits per unit time or bits per second that may be reliably transported over the channel.

Coders of various forms have been and continue to be utilized. A pulse code modulated (PCM) coder represents the information to be transported, such as the amplitude of a speech signal at a given time or sample point, as a series of bits or pulses, typically eight. Other coders, seeking to lower bits per second or bit rate on the channel for a given quality, have sought to take advantage of the correlation between sample points for most signals such as speech. A differential pulse code modulated (DPCM) coder thus encodes as bits the difference between, for example, the amplitudes of successive samples, the expectation being that it takes less bits to encode the change or difference between samples than the absolute amplitude or value of each sample.

Still another popular coder is the adaptive differential pulse code modulated (ADPCM) coder. This form of coder includes a signal synthesizer and seeks to, adaptively based on signal characteristics, predict subsequent samples. The information transported over the channel then, includes, an encoded version of the difference between an actual sample and the predicted value of that sample. Coders that seek to take advantage of signal correlation in return for lower channel bit rates generally rely on the recipient of the encoded information having previous properly decoded samples of such information in order to properly decode the present sample. Absent such information the coder responsible for decoding will not be initialized, specifically have the proper state parameters for decoding a present sample. If used to decode without the correct state parameters these coders will generate an output signal with serious and, if speech, annoying discontinuities or inaccuracies.

One approach to resolving the problem of discontinuities is to transmit the state information of the coder over the channel but this results in extra bits or a higher bit rate thus voiding at least in part the initial motivations for using this type of coder. Due to these issues such coders have been most successfully deployed where discontinuities are not perceived as a problem or where they are relatively unlikely to occur. When the channel is relatively high quality or low noise and the channel bit stream is essentially continuous, such as many wireline systems, discontinuities are unlikely to occur and unlikely to be a significant perceptual problem. Such coders can and have been successfully used under these conditions.

However presently many communications systems are being deployed that use a packetized channel format. These systems by definition do not have a continuous bit stream. Further in circumstances where channel quality may be relatively low, such as wireless channels, many systems are designed for or allow for receiving packets out of order. Here the bit stream is not even quasi continuous. Thus ADPCM and the like coders generally have not been successfully used in packetized systems, particularly systems with poor channel quality or low tolerance for discontinuities such as speech. On the other hand systems with poor channel quality are ordinarily systems that can most benefit from the potentially lower bit rates offered by ADPCM coders. Clearly a need exists for a self initialized coder, such as an ADPCM coder, that can successfully receive a discontinuous bit stream.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
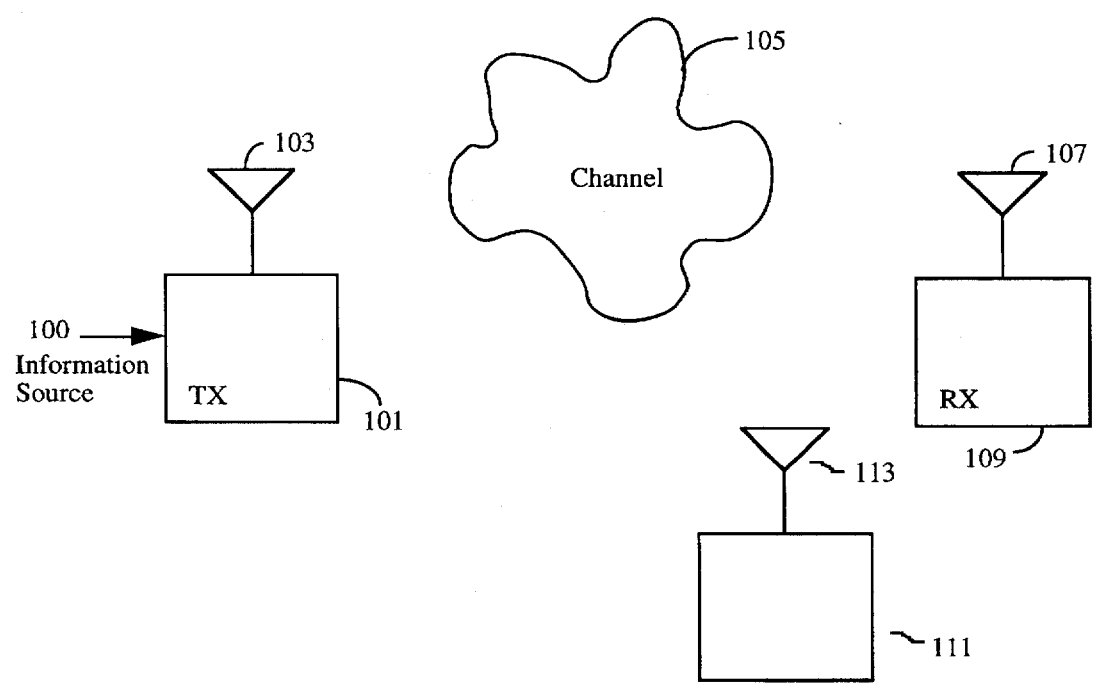
FIG. 1 is a block diagram of a wireless messaging system suitable for employing an embodiment of the instant invention.

The preferred embodiment of the present invention is set in a messaging system arranged and constructed for the delivery of an information stream including messages from an originating point or source to a receiving point. The information stream is encoded by a coder such as preferably an ADPCM coder or the like. The information stream, after encoding, is transported over a channel, preferably a wireless channel using a packetized format. The preferred embodiment deals with apparatus and methods for decoding the information stream as received and more specifically with ways of self initializing or estimating one or more state parameters for a receiver or coder used as part of the receiver. The instant invention is particularly advantageous in a packetized system when packets are received and should or must be decoded out of order or where the received information stream is for any other reason temporally scrambled or interrupted.

More specifically, a preferred method embodiment of initializing a coder or estimating a state parameter for a coder decoding a previously encoded information stream, the coder used as part of a communications receiver adapted to receive the information stream, is defined to include the steps of: storing a portion of the information stream, reversing, temporally, a first part of the portion to provide a file header, first decoding the file header to provide an estimate of the state parameter, and thereafter or secondly decoding, using the estimate, the portion of the information stream to provide a decoded signal. This method may be further developed to include a step of determining that the portion is temporally out of sequence or out of time sequence or a step of selecting the first part such that the file header has statistical properties representative of the portion. This step of selecting may be facilitated by choosing a predetermined time duration for the first part either sufficient to insure that the first part has statistical properties representative of the portion or subject to an alternative minimum time duration that facilitates expedited decoding.

The method above may be enhanced when the step of temporally reversing the first part includes a further step of aligning the earliest portion of the first part such that continuity of an amplitude characteristic and a phase characteristic is maintained between the file header and the portion. The step of temporally reversing the first part to provide the file header may be enhanced by further providing a reversed first part and including a step of combining the first part and the reversed first part to provide the file header.

In apparatus format with varying scope a self initialized coder arranged and constructed for decoding an information stream is defined to include a buffer for storing a portion of the information stream, a controller coupled to the buffer for temporally reversing a first part of the portion to provide a file header, and an adaptive decoder having a state parameter, the adaptive decoder, coupled to the controller and the buffer, for decoding the file header to provide an estimate of the state parameter and thereafter for decoding, using the estimate, the portion to provide a decoded signal. In varying scope a corresponding self-initialized data receiver is described.

Similar to the method above this self-initialized coder via the processor or more specifically controller will determine when the portion is temporally out of sequence and select a first part with proper statistical properties. This may, for example, require a predetermined time duration for the first part. Alternatively the first part may be selected with a minimum time duration consistent with a processing latency requirement. In any event, preferably, the controller further aligns an earliest part of the first part such that continuity of an amplitude characteristic and a phase characteristic is maintained between the file header and the portion. In case of a minimum time duration the controller will provide a reversed first part and includes a function for combining the first part and the reversed first part to provide the file header.

Referring to the figures for a more detailed explanation, FIG. 1 depicts in overview fashion a messaging system, more specifically a wireless messaging system such as known paging systems, coupled to an information or message source (100), such as a system controller, public switched network, or the like. The information source is coupled to a transmitter (101) that is coupled to an antenna (103). The antenna is coupled, via a channel (105), to receive antennas (107, 113) that in turn are, respectively, coupled to communications receivers (109, 111). Generally in operation the messaging system is intended to deliver messages, supplied by the information source, from the transmitter to the communications receivers.

Ordinarily this is selective messaging in that a particular message is to be delivered to a particular communications receiver or group of such receivers. For the instant disclosure the messages are in the form of an information stream encoded by a coder where the information stream is preferably in a packetized format as is generally known. It is to be understood that FIG. 1 is merely an example and that actual systems may include multiple transmitters with each transmitter arranged to and capable of providing messaging service to a multiplicity of communications receivers.

Figure 2:
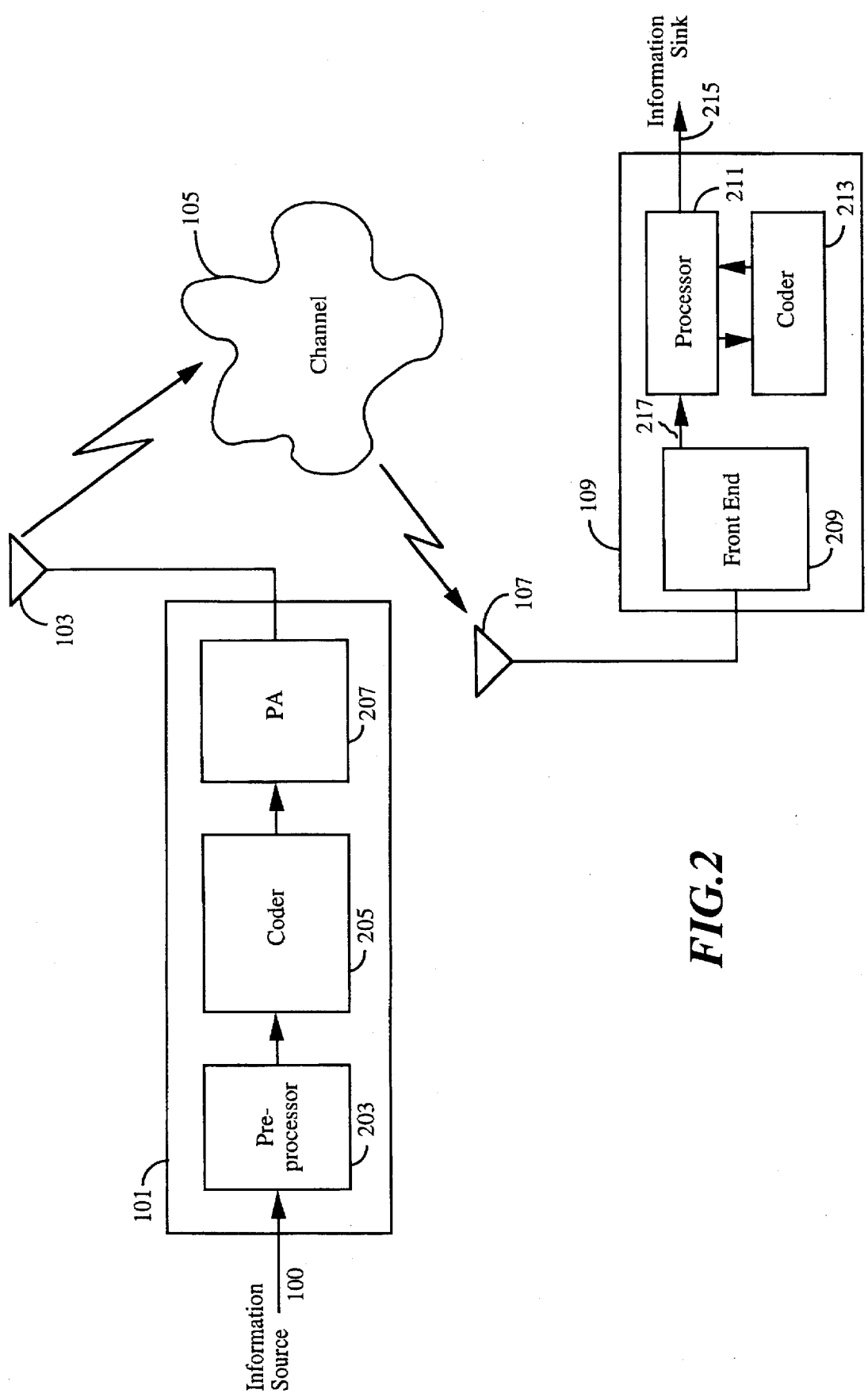
FIG. 2 is a more detailed block diagram of a transmitter and a preferred embodiment of a self initialized data receiver as used in the FIG. 1 messaging system.

FIG. 2 is a more detailed block diagram of the transmitter (101) and the communications receiver (109) as used in the FIG. 1 messaging system or more specifically a preferred embodiment of a self initialized data receiver. Like elements in FIG. 2, FIG. 1, and the other FIGs bear like reference numerals. In FIG. 2 the transmitter (101) includes a preprocessor (203) coupled to the information source (100) and further to an encoder or transmit coder (205). The preprocessor performs baseband signal conditioning, and prepares the data for transmission by the digital system. These tasks are generally known and include storing data, segmenting data into packets, formatting data according to established transmission standards, and performing various other management tasks required by the transmitter.

The transmit coder (205), preferably an ADPCM, coder encodes the messages into an information stream that is further coupled to the PA (207). PA (207) includes a power amplifier, such as a radio frequency amplifier, and operates to appropriately modulate a carrier with the information stream as encoded, to amplify the modulated carrier, and to couple the resultant to the antenna (103).

At the self-initialized data receiver (109) antenna (107) picks up the modulated carrier from the channel and couples it to a front end (209). The front end is generally known and includes such functions as filtering, amplification, demodulation, and frequency translation. The front end, specifically these functions, is arranged and constructed for demodulating the carrier to provide an information stream to a processor (211) at input (217). The processor (211), so coupled to the front end, provides processing and control functions for the receiver including, and intercoupled thereto, a coder (213). Such functions include among others storing a portion of the information stream and then time or temporally reversing a first part of the portion to provide a file header.

The coder (213) is an adaptive decoder, such as an ADPCM decoder, in that the present or current decoded results depend on previous results. That is to say that the decoder (213) has one or more state parameters with values that depend on history. Pursuant to being self initialized, circumstances warranting, the adaptive decoder decodes the file header to provide an estimate of these state parameters and then, using these estimates, decodes the portion to provide a decoded signal to the processor for further processing and ultimately delivery to an information sink (215), such as a display, speaker, network, etc.

Figure 3:
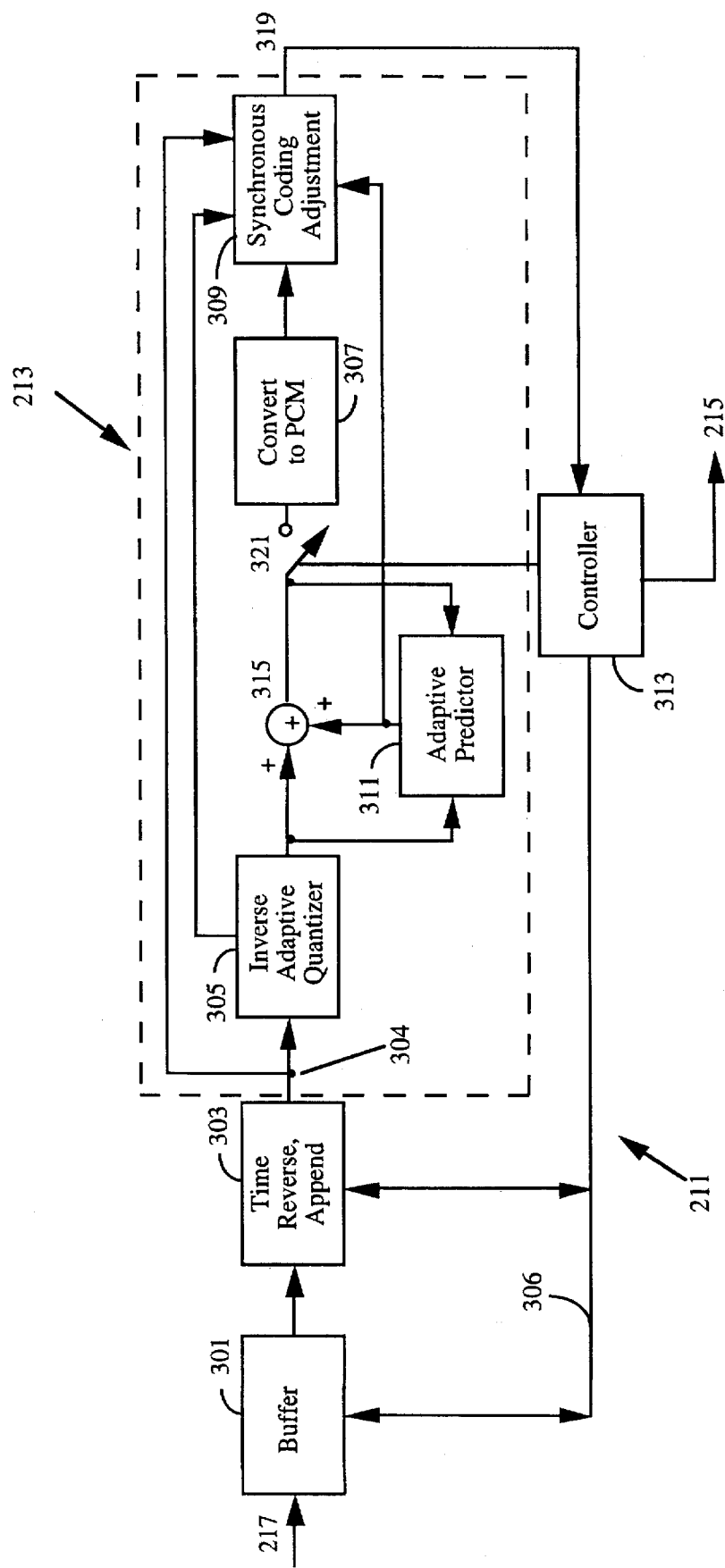
FIG. 3 is a more detailed block diagram of a processor and coder in accordance with a preferred embodiment of the instant invention, the coder suitable for use in the FIG. 2 receiver.

Referring to the more detailed block diagram of FIG. 3, a self initialized coder is depicted. This coder includes the processor (211) and coder (213). The processor (211) includes, coupled to the input (217), a buffer (301) further coupled to a time reverse and append function (303). This function (303) is coupled to the input (304) of the coder (213). Both the buffer and coder are coupled via a bus (306) to a controller (313) also included in the processor (211).

The self initialized coder is arranged and constructed for decoding an information stream that is provided from the front end (209). Generally the buffer (217) stores a portion, such as preferably a packet, of the information stream. The controller via the bus (306) will read the contents of the buffer, preferably determine whether they are temporally out of order, if so select a first part of these contents, and time or temporally reverse this first part to form or provide a file header that is or may then be stored at the time reverse and append function (303). The coder (213) is more specifically an adaptive decoder in that it has state parameters and a current result depends on a past result. The controller and buffer are coupled to the decoder by the time reverse and append function and the decoder operates to decode the file header and in so doing provides an estimate of the state parameter. As the file header is decoded any results from the decoder are discarded by the controller. After decoding the file header, the decoder, using the estimate of the state parameter, decodes the portion of the information stream and thus provides a decoded signal for the information sink at (215).

The preferred embodiment of the adaptive decoder or coder (213) may be further understood by reference to the CCITT Blue Book Recommendation G.721, published in 1988. This recommendation titled 32 kbit/s ADAPTIVE DIFFERENTIAL PULSE CODE MODULATION (ADPCM) is herein incorporated by reference. In order to avoid undue duplication and volume the explanation here will be brief and somewhat repetitious of Recommendation G.721 as the reader can find all of the detail there. While this explanation will focus on one those of ordinary skill in the art will realize that the principles discussed are applicable to all scalar waveform coders regardless of bit rate. Examples of other CCITT standards that are applicable include G.723 24 kbps and 40 kbps coders. The coder (213) receives, at an inverse adaptive quantizer (305), a 32 kbit/s (4 bit/sample) sampled input signal of error signals as encoded by an ADPCM coder and operates to produce a 64 kbit/s (8 bit/sample) PCM signal at output (319). The inverse adaptive quantizer (305) produces a quantized difference signal where a present output sample depends on previous samples or the value(s) of certain state parameter. The quantized difference signal is coupled to a summer (315) and an adaptive predictor (311).

The adaptive predictor produces a signal estimate that is coupled to the summer (315). The summer produces a reconstructed signal equivalent to or corresponding to the quantized difference signal plus the signal estimate. This reconstructed signal (14 bits/sample) is coupled back to the adaptive predictor. The adaptive predictor (311) thus also has an output that depends on previous outputs or history or the value of a state parameter. The reconstructed signal is coupled via switch (321) to a Convert to PCM block (307) and thus to synchronous coding adjustment function (309) where a decoded signal is provided at output (319). Switch (321) is controlled by the controller (313) and allows for decoder outputs to be discarded when file headers are being decoded pursuant to producing an estimate of the state parameters for the coder or initializing the coder. The Convert to PCM block (307) operates to convert the reconstructed signal in a 14 bits/sample format, at the switch (321), to a PCM format in an 8 bits/sample format. The synchronous coding adjustment function (309) operates to do some timing adjustments and is covered in the references.

The controller in the preferred embodiment determines when the portion is out of sequence. In the preferred embodiment this is done using a unique identifying number of each packet. If the received packet follows in order, the packet may be decoded without degradation using as initial decoder conditions the state parameters or the state remaining from the previous packet. If the packet is not in order, and initial decoder conditions are unavailable, a suitable initializing sequence must be constructed by the processor, specifically the controller, buffer, etc.

In sum the processor constructs a file header or initializing sequence from the portion or packet when the decoder needs to be initialized or otherwise required. This is accomplished, preferably, by selecting the first few samples received in the packet, temporally reversing them taking care to avoid duplicating the first sample and driving the decoder with this file header to estimate all state parameters, thus initialize the decoder. After processing this header, the coder converges to initial conditions suitable for decoding the original data packet. During this initializing activity outputs from the decoder are discarded. Then the received data packet or portion is decoded, without introducing any signal degradation.

The training sequence or file header must provide sufficient training samples to permit the decoder to converge to satisfactory initial conditions for subsequent packet decoding. A training sequence of 8 ms has been found sufficient to train the G.723 24 kbps ADPCM decoder. Simply reversing the file header results in the replication of the first sample point. This may be eliminated by deleting the first sample from the reversed file header. This maintains amplitude continuity as much as possible, and avoids introducing harmonics into the speech data. If the data packet begins with silence the training sequence may be unnecessary regardless of packet sequence status. Similarly, if the packet begins with unvoiced speech, the training period may be reduced. Any known energy detection scheme may be used to determine the length of file header required.

To eliminate undue processing latency, the file header may consist of multiple replications of the same, smaller section of the data packet. This avoids delay due specifically to waiting for sufficient data samples from which to construct the file header if, for example, the data rate is low. Again attention should be paid to eliminate replicating a sample within the training sequence, thus insuring that amplitude and phase characteristics are continuous throughout the file header and between the file header and the portion or packet to be decoded. Additional discussion will be found below with the description of FIG. 5

Physically the preferred embodiment of the present invention includes a Motorola MCM56166 Digital Signal Processor (DSP) operating at 60 Mhz and a Motorola general purpose microprocessor MCM68360 integrated circuit (IC). These ICs are executing software, readily produced by one of ordinary skill in the art, developed to accomplish the functions and requirements herein explained. The preferred embodiment is intended to operate in a packet based protocol system. The system is used for two-way voice paging. The data is encapsulated into frames of 1.875 secs, sampled at 8000 samples/sec. Within each frame, the voice is segmented into increments of no less than 300 ms. The data is then broadcast in the 900 MHz narrow-band PCS band, at 25 kHz spacing.

Figure 5:
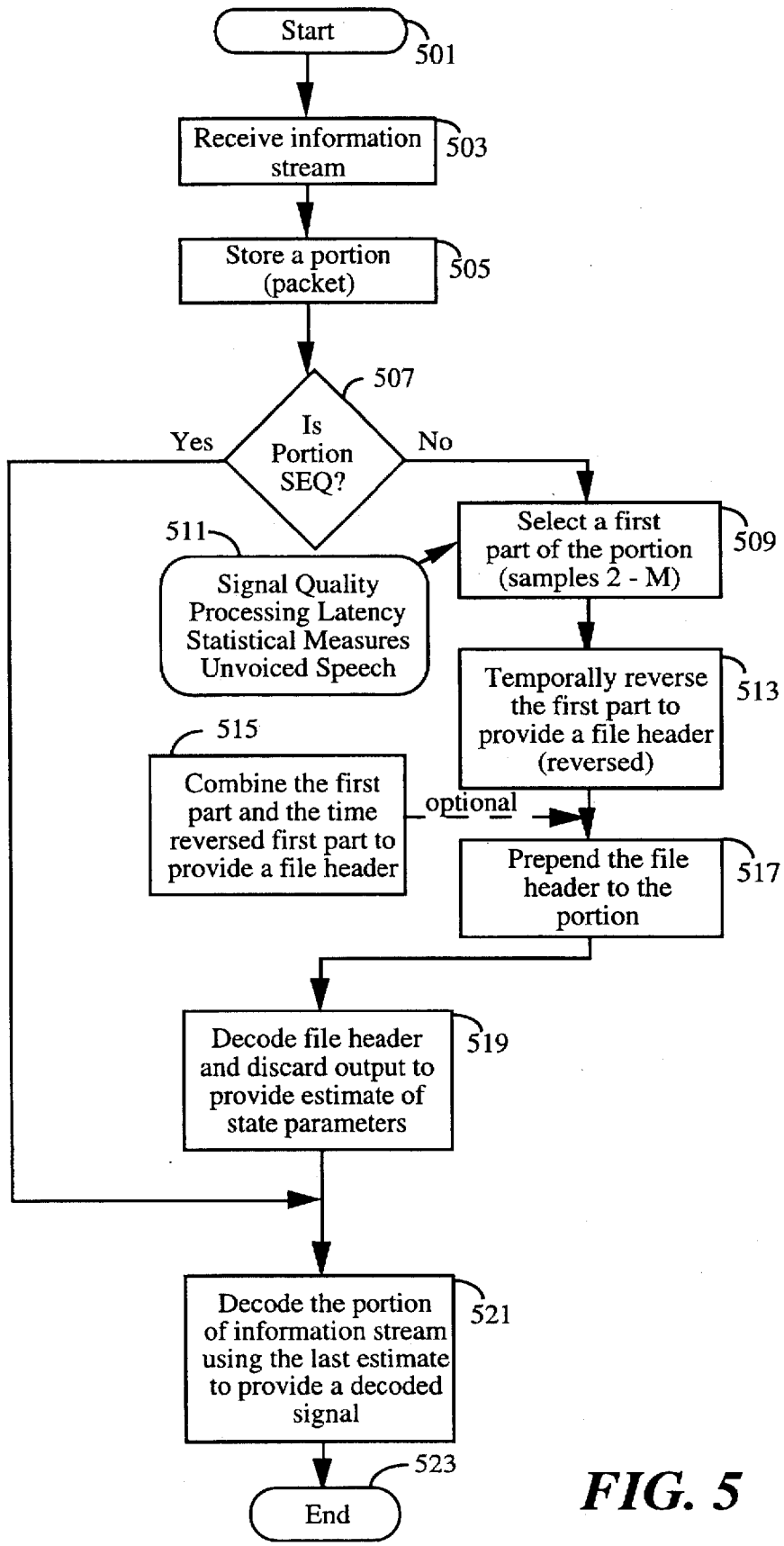
FIG. 5 is a flow chart of a preferred method of initializing a coder in accordance with the instant invention.

Referring to the FIG. 5 flow chart of a method embodiment and recalling that this method is preferably set in a communications receiver adapted to receive an information stream that has been encoded by a, preferably, ADPCM coder, the process begins at (501) by receiving an information stream at step (503). Preferably this stream is in a digital packet data format. Next, at step (505), a portion, such as preferably a packet, of the stream is stored or buffered by, for example the buffer (301) for subsequent processing. Then at step (507) it is determined whether the stored portion is sequential or temporally out of sequence by, preferably, comparing a packet number for this portion with a last decoded or received packet number at, for example, the controller (313). If this portion is sequential the process continues to step (521) where the portion or packet is decoded using the last estimate of the state parameters or last state of the decoder. This provides a decoded signal and the process ends at (523).

Figure 4:
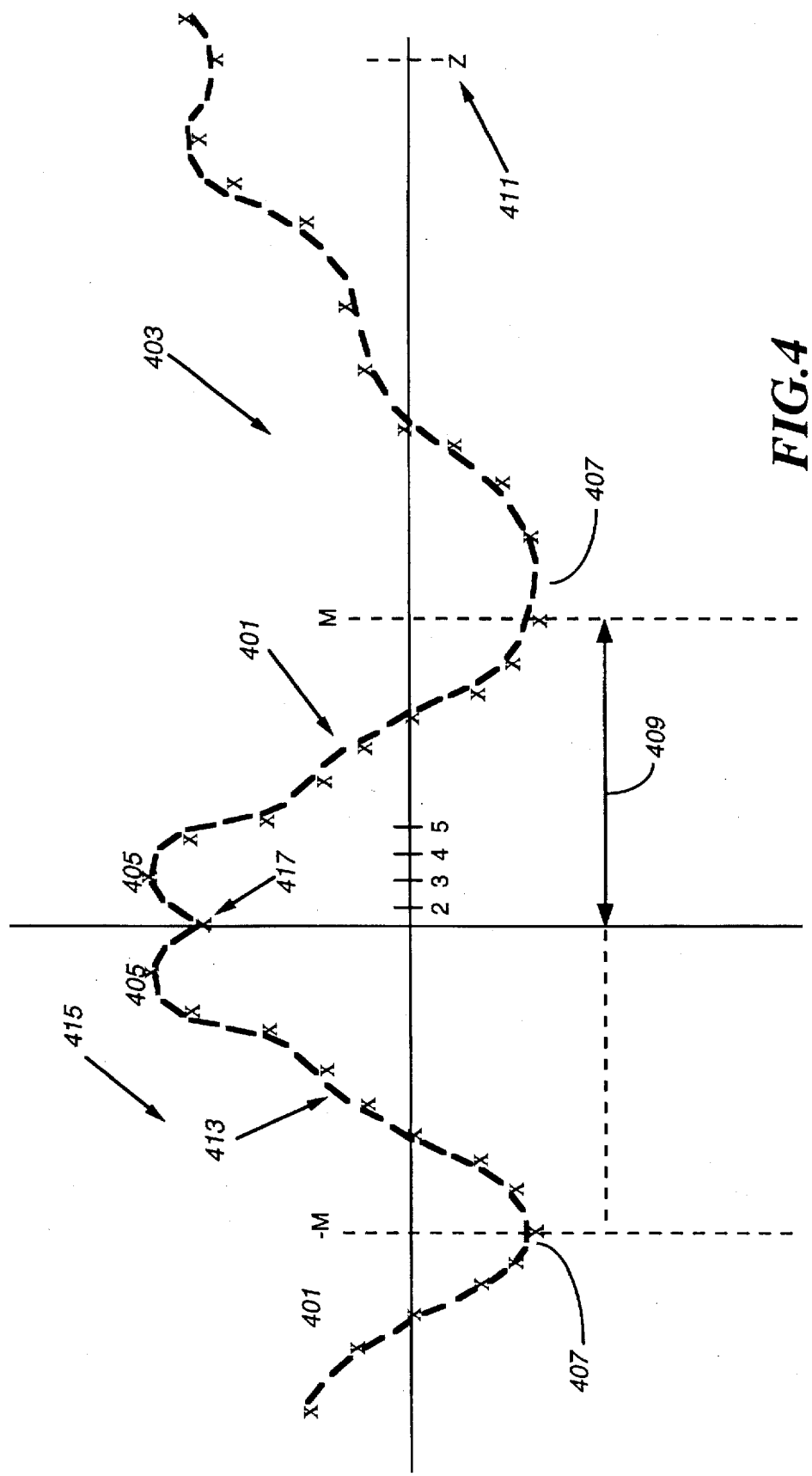
FIG. 4 is a exemplary signal diagram suited to understanding certain functions within FIG. 3.

If not sequential, the process of FIG. 5 moves to step (509) and begins a procedure that will initialize the coder so the portion may subsequently be properly decoded. Generally this includes constructing an appropriate file header and training or initializing the coder with this file header. Referring additionally to FIG. 4, step (509) selects a first part (401) of the portion (403), specifically samples 2 (405) through M (407). The desired value for M will, preferably, take into consideration various factors such as noted at (511), specifically signal quality, processing latency, statistical properties of the samples, and if the underlying signal is speech whether the portion is voiced or unvoiced.

These various considerations may represent a tradeoff or compromise between acceptable signal quality, processing latency or delay, available processing power or capacity, and the statistical characteristics or properties of the underlying signal. Generally speaking the adaptive decoder or coder (213) will approach the proper state or attain the correct state parameters or asymptotically become initialized provided the coder is decoding a signal that is statistically similar to the portion for a sufficient period of time.

Said another way step (509) selects the first part or samples 2 through M such that the file header once constructed has statistical properties representative of the portion. In the case of speech and many other real world time varying signals, statistics, such as averages, variances, etc., for such signals are relatively stable over short periods of time, such as 10 to 20 milliseconds (ms) for speech. In this case selecting enough samples or M to be statistically representative of the portion amounts to choosing a predetermined time duration (409), such as 10 ms for the first part. In any event at step (513) the first part (401) is temporally reversed to provide a time reversed first part (413) and preferably a file header (415). The step (513) of temporally reversing the first part includes a step of aligning the earliest portion (sample 2 (405)) of the first part such that continuity of an amplitude characteristic and a phase characteristic is maintained between the file header and the portion. In practice this amounts to insuring that a given sample, such as sample 1 (417) is neither repeated nor discarded.

As will be more apparent as the discussion continues a processing latency or time before the portion may begin to be decoded of at least the time to receive M samples will be incurred. In those cases where processing latency should be minimized the predetermined time duration should be selected subject to a minimum time duration as further dictated by acceptable decoded signal quality requirements. As an example M may be chosen so as to encompass all samples Z (411) within the portion, in which case the first part, reversed first part and file header will have statistics similar to the portion in that the first part will be identical to the portion.

In circumstances where processing latency needs to be minimized the first part or M may be selected to have a time duration substantially less than the packet or portion, subject to the above mentioned statistical similarities versus decoded signal quality. Even here a file header of relatively arbitrary duration may be constructed by exercising optional step (515). This step combines the first part and the reversed first part, taking care to avoid duplicating sample M (407), to provide the file header. This step may be repeated multiple times if desired.

In any event once the file header is constructed and prepended to the portion at step (517), step (519) decodes the file header to provide an estimate of the state parameter (s) for the coder, discarding any output from the coder while this is underway. In this manner the coder is initialized by estimating the relevant state parameters for decoding the portion. Step (521) then decodes the portion or packet of the information stream using the last or latest estimate for the state parameters thus providing a decoded signal. Step (521) will be undertaken if the portion is sequenced properly as determined at step (507) or after step (519) is completed. After step (521) the process ends at (523).

It will be appreciated by those of ordinary skill in the art that the apparatus and methods disclosed provide various approaches for self initializing a coder, such as an ADPCM coder, thus allowing the reception of discontinuous information streams by such coders. This has been done without compromising the accuracy of such a coder or decoder, without otherwise unnecessarily burdening processing resources, or channel resources. These inventive structures and methods may be readily and advantageously employed in a messaging system, messaging receiver, or decoder or other communications device or system so as to allow the use of adaptive decoders with packet data type protocols even with low quality channels. Hence, the present invention, in furtherance of satisfying a long-felt need of messaging systems, readily facilitates, for example, low band width portable receivers by providing methods and apparatus allowing the use of ADPCM coders that are practical to implement from a physical, economic and power source perspective in for example a portable product, such as a pager or other messaging device.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. In a communications receiver adapted to receive an information stream, the information stream encoded by a coder, a method of initializing a coder decoding the information stream, the method including the steps of:

storing a portion of the information stream, reversing, temporally, a first part of said portion to provide a file header, first decoding said file header to provide an estimate of the state parameter, and thereafter second decoding, using said estimate, said portion of the information stream to provide a decoded signal.

2. The method of claim 1 further including a step of determining that said portion is temporally out of sequence.

3. The method of claim 1 further including selecting said first part such that said file header has statistical properties representative of said portion.

4. The method of claim 3 wherein said step of selecting said first part further includes a step of choosing a predetermined time duration for said first part.

5. The method of claim 4 wherein said step of choosing said predetermined time duration is such that said first part has statistical properties representative of said portion.

6. The method of claim 5 wherein said step of choosing said predetermined time duration is such that said first part has a minimum time duration.

7. The method of claim 1 wherein said step of temporally reversing said first part includes a step of aligning an earliest portion of said first part such that continuity of an amplitude characteristic and a phase characteristic is maintained between said file header and said portion.

8. The method of claim 7 wherein said step of temporally reversing said first part further provides a reversed first part and includes a step of combining said first part and said reversed first part to provide said file header.

9. A self initialized coder arranged and constructed for decoding an information stream, the coder comprising in combination;

a buffer for storing a portion of the information stream, a controller coupled to said buffer for temporally reversing a first part of said portion to provide a file header, and an adaptive decoder having a state parameter, said adaptive decoder, coupled to said controller and said buffer, for decoding said file header to provide an estimate of said state parameter and thereafter for decoding, using said estimate, said portion to provide a decoded signal.

10. The self initialized coder of claim 9 wherein said controller determines when said portion is temporally out of sequence.

11. The self initialized coder of claim 9 wherein said controller further selects said first part such that said file header has statistical properties representative of said portion.

12. The self initialized coder of claim 11 wherein said controller further chooses a predetermined time duration for said first part.

13. The self initialized coder of claim 12 wherein said controller further chooses said predetermined time duration such that said first part has statistical properties representative of said portion.

14. The self initialized coder of claim 13 wherein said controller further chooses said predetermined time duration in accordance with a processing latency for said portion.

15. The self initialized coder of claim 9 wherein said controller further aligns an earliest part of said first part such that continuity of an amplitude characteristic and a phase characteristic is maintained between said file header and said portion.

16. The self initialized coder of claim 15 wherein said controller further provides a reversed first part and includes a function of combining said first part and said reversed first part to provide said file header.

17. A self initialized data receiver arranged and constructed for receiving an information stream, the data receiver comprising in combination;

a front end for demodulating a carrier to provide an information stream, a processor coupled to said front end for storing a portion of said information stream and for temporally reversing a first part of said portion to provide a file header, and an adaptive decoder having a state parameter and coupled to said processor for decoding said file header to provide an estimate of said state parameter and thereafter for decoding, using said estimate, said portion to provide a decoded signal.

18. The self initialized data receiver of claim 17 wherein said processor determines when said portion is temporally out of sequence.

19. The self initialized data receiver of claim 17 wherein said processor further selects said first part such that said file header has statistical properties representative of said portion.

20. The self initialized data receiver of claim 19 wherein said processor further chooses a predetermined time duration for said first part.

21. The self initialized data receiver of claim 20 wherein said processor further chooses said predetermined time duration such that said first part has statistical properties representative of said portion.

22. The self initialized data receiver of claim 21 wherein said processor further chooses said predetermined time duration in accordance with a processing latency for said portion.

23. The self initialized data receiver of claim 17 wherein said processor further aligns an earliest part of said first part such that continuity of an amplitude characteristic and a phase characteristic is maintained between said file header and said portion.

24. The self initialized data receiver of claim 23 wherein said processor further provides a reversed first part and includes a step of combining said first part and said reversed first part to provide said file header.

* * * * *